United States Patent
Yang et al.

(10) Patent No.: US 10,531,489 B2
(45) Date of Patent: Jan. 7, 2020

(54) METHOD AND DEVICE FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/074,720

(22) PCT Filed: Feb. 2, 2017

(86) PCT No.: PCT/KR2017/001156
§ 371 (c)(1),
(2) Date: Aug. 1, 2018

(87) PCT Pub. No.: WO2017/135712
PCT Pub. Date: Aug. 10, 2017

(65) Prior Publication Data
US 2019/0124689 A1   Apr. 25, 2019

Related U.S. Application Data

(60) Provisional application No. 62/289,941, filed on Feb. 2, 2016, provisional application No. 62/290,983, filed
(Continued)

(51) Int. Cl.
*H04W 74/08* (2009.01)
*H04L 5/00* (2006.01)
*H04W 72/04* (2009.01)

(52) U.S. Cl.
CPC .......... *H04W 74/0808* (2013.01); *H04L 5/00* (2013.01); *H04W 72/0413* (2013.01); *H04W 72/0446* (2013.01)

(58) Field of Classification Search
CPC ............. H04W 74/08; H04W 74/0808; H04W 72/0413; H04W 72/0446
See application file for complete search history.

(56) References Cited

U.S. PATENT DOCUMENTS

2014/0341018 A1* 11/2014 Bhushan ........... H04W 28/0289
370/230
2015/0023315 A1* 1/2015 Yerramalli .......... H04W 74/002
370/330
(Continued)

FOREIGN PATENT DOCUMENTS

| KR | 10-2016-0010850 A | 1/2016 |
| WO | WO 2015/061286 A1 | 4/2015 |
| WO | WO 2015/169397 A1 | 11/2015 |

*Primary Examiner* — Jenee Holland
(74) *Attorney, Agent, or Firm* — Birch, Stewart, Kolasch & Birch, LLP

(57) ABSTRACT

The present invention relates to a wireless communication system, and specifically, to a method and a device for the method which comprises the steps of: aggregating a LCell and a UCell in order to communicate with a base station; and transmitting a slotted uplink physical channel via only one slot among a plurality of slots of a subframe #m of the UCell, wherein the transmission of the slotted uplink physical channel includes performing a first CCA procedure X-time prior to a reference time point of the first slot of the subframe #m, and if the first CCA procedure fails, performing a second CCA procedure Y-time (Y>X) prior to a reference time point of the second slot of the subframe #m.

12 Claims, 14 Drawing Sheets

Related U.S. Application Data on Feb. 4, 2016, provisional application No. 62/295,128, filed on Feb. 14, 2016.

(56) References Cited

U.S. PATENT DOCUMENTS

| | | | |
|---|---|---|---|
| 2015/0049708 A1* | 2/2015 | Damnjanovic | H04L 1/1812 370/329 |
| 2015/0049712 A1* | 2/2015 | Chen | H04W 72/1215 370/329 |
| 2015/0049715 A1* | 2/2015 | Yerramalli | H04L 5/1469 370/329 |
| 2015/0055541 A1* | 2/2015 | Zhang | H04W 72/005 370/312 |
| 2015/0092702 A1* | 4/2015 | Chen | H04W 72/082 370/329 |
| 2015/0195849 A1 | 7/2015 | Bashar et al. | |
| 2015/0349931 A1* | 12/2015 | Damnjanovic | H04L 5/0007 370/280 |
| 2016/0073366 A1* | 3/2016 | Ng | H04W 56/001 370/329 |
| 2016/0127098 A1* | 5/2016 | Ng | H04L 5/0048 370/329 |
| 2016/0135143 A1* | 5/2016 | Won | H04W 72/005 370/312 |
| 2016/0135179 A1* | 5/2016 | Yin | H04J 11/0069 370/329 |
| 2016/0192396 A1* | 6/2016 | Ng | H04W 74/0808 370/329 |
| 2016/0212767 A1* | 7/2016 | Yin | H04W 24/08 |
| 2016/0302230 A1* | 10/2016 | Novlan | H04B 17/318 |
| 2016/0360525 A1* | 12/2016 | Cheng | H04L 5/001 |
| 2017/0142751 A1* | 5/2017 | Liu | H04L 5/1415 |
| 2017/0238311 A1* | 8/2017 | Hooli | H04W 74/0816 370/329 |
| 2017/0303220 A1* | 10/2017 | Sadeghi | H04L 5/0053 |
| 2017/0359850 A1* | 12/2017 | Loehr | H04W 76/28 |
| 2018/0103458 A1* | 4/2018 | Tooher | H04W 16/14 |

* cited by examiner

PUCCH format 1a and 1b structure (normal CP case)

PUCCH format 2, 2a and 2b structure (normal CP case)

ion system includes a CA-based (Carrier Aggregation-based) wireless communication system.
US 10,531,489 B2

METHOD AND DEVICE FOR TRANSMITTING/RECEIVING WIRELESS SIGNAL IN WIRELESS COMMUNICATION SYSTEM

CROSS REFERENCE TO RELATED APPLICATIONS

This application is the National Phase of PCT International Application No. PCT/KR2017/001156, filed on Feb. 2, 2017, which claims priority under 35 U.S.C. 119(e) to U.S. Provisional Application Nos. 62/289,941, filed on Feb. 2, 2016, 62/290,983, filed on Feb. 4, 2016 and 62/295,128, filed on Feb. 14, 2016, all of which are hereby expressly incorporated by reference into the present application.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, a method of transmitting an uplink signal by a UE in a wireless communication system includes: aggregating a licensed band cell (LCell) and an unlicensed band cell (UCell) in order to communicate with a base station; and transmitting a slotted uplink physical channel in only one of a plurality of slots of a subframe #m of the UCell, wherein transmission of the slotted uplink physical channel includes performing a first clear channel assessment (CCA) procedure a time X before a reference time of the first slot of the subframe #m and if the first CCA procedure fails, performing a second CCA procedure a time Y (Y>X) before a reference time point of the second slot of the subframe #m.

In another aspect of the present invention, a UE configured to transmit an uplink signal in a wireless communication system includes: a radio frequency (RF) module; and a processor, wherein the processor is configured to aggregate a licensed band cell (LCell) and an unlicensed band cell (UCell) in order to communicate with a base station and to transmit a slotted uplink physical channel in only one of a plurality of slots of a subframe #m of the UCell, wherein transmission of the slotted uplink physical channel includes performing a first CCA procedure a time X before a reference time of the first slot of the subframe #m and if the first CCA procedure fails, performing a second CCA procedure a time Y (Y>X) before a reference time point of the second slot of the subframe #m.

Preferably, the slotted uplink physical channel may be transmitted in the first slot of the subframe #m without transmission of a reservation signal when the first CCA procedure has been successfully performed.

Preferably, the slotted uplink physical channel may be transmitted in the second slot of the subframe #m after transmission of the reservation signal when the second CCA procedure has been successfully performed.

Preferably, a third CCA procedure may be further performed the time X before the reference time of the second slot of the subframe #m when the second CCA fails.

Preferably, the uplink physical channel may be transmitted over a plurality of slots of a subframe #n of the LCell.

Preferably, the uplink physical channel may include a physical uplink control channel (PUCCH) or a physical uplink shared channel (PUSCH).

Advantageous Effects

According to the present invention, wireless signal transmission and reception can be efficiently performed in a wireless communication system.

Effects obtainable from the present invention may be non-limited by the above mentioned effect. In addition, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
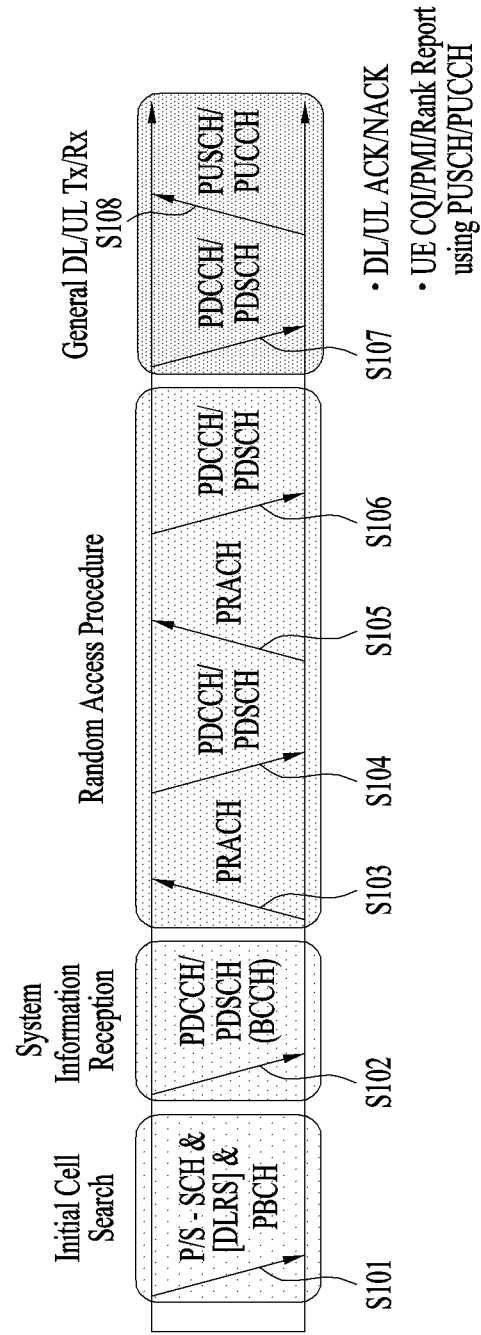
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be periodically transmitted through a PUSCH according to request/command of a network.

Figure 2:
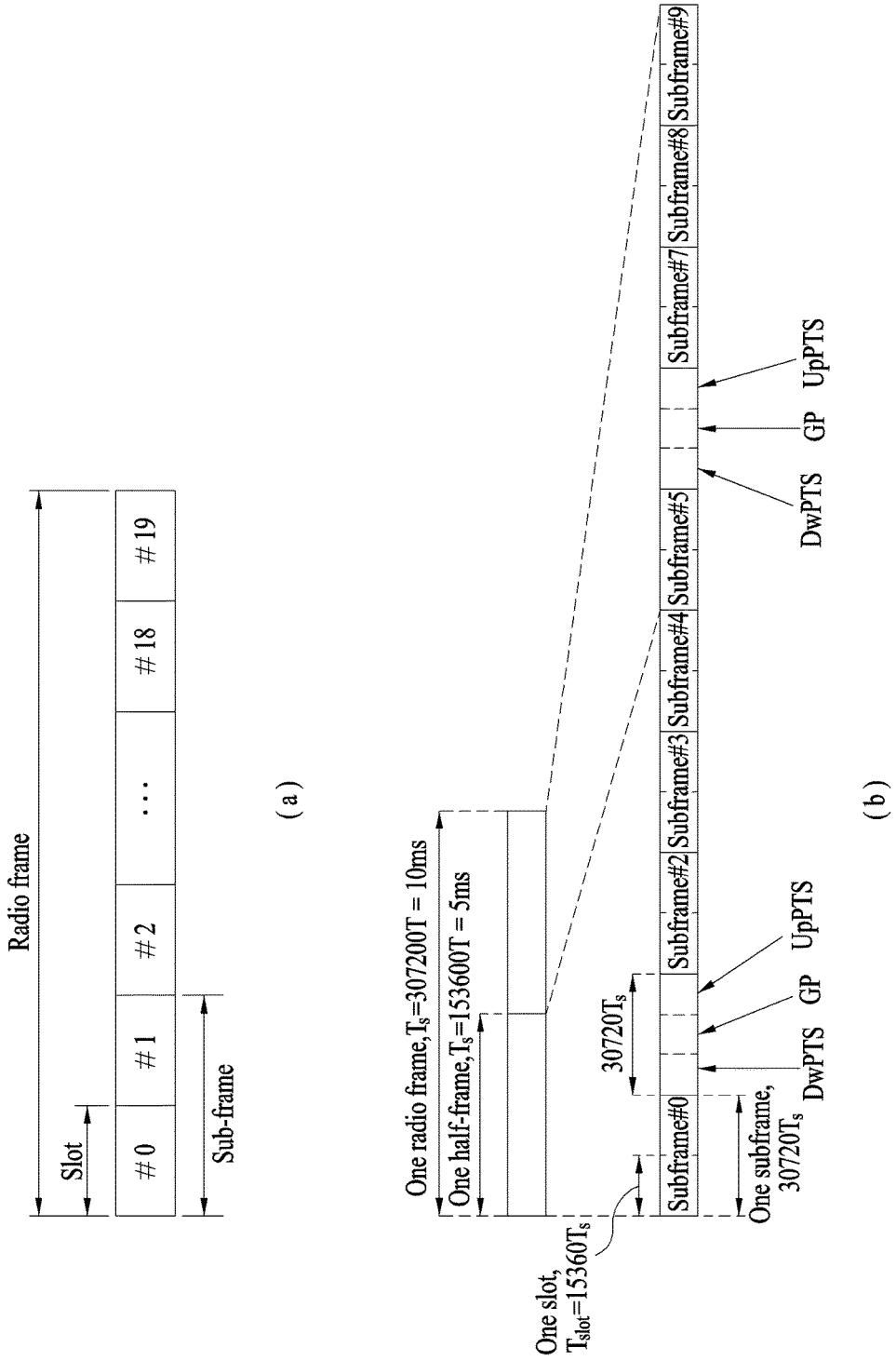
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
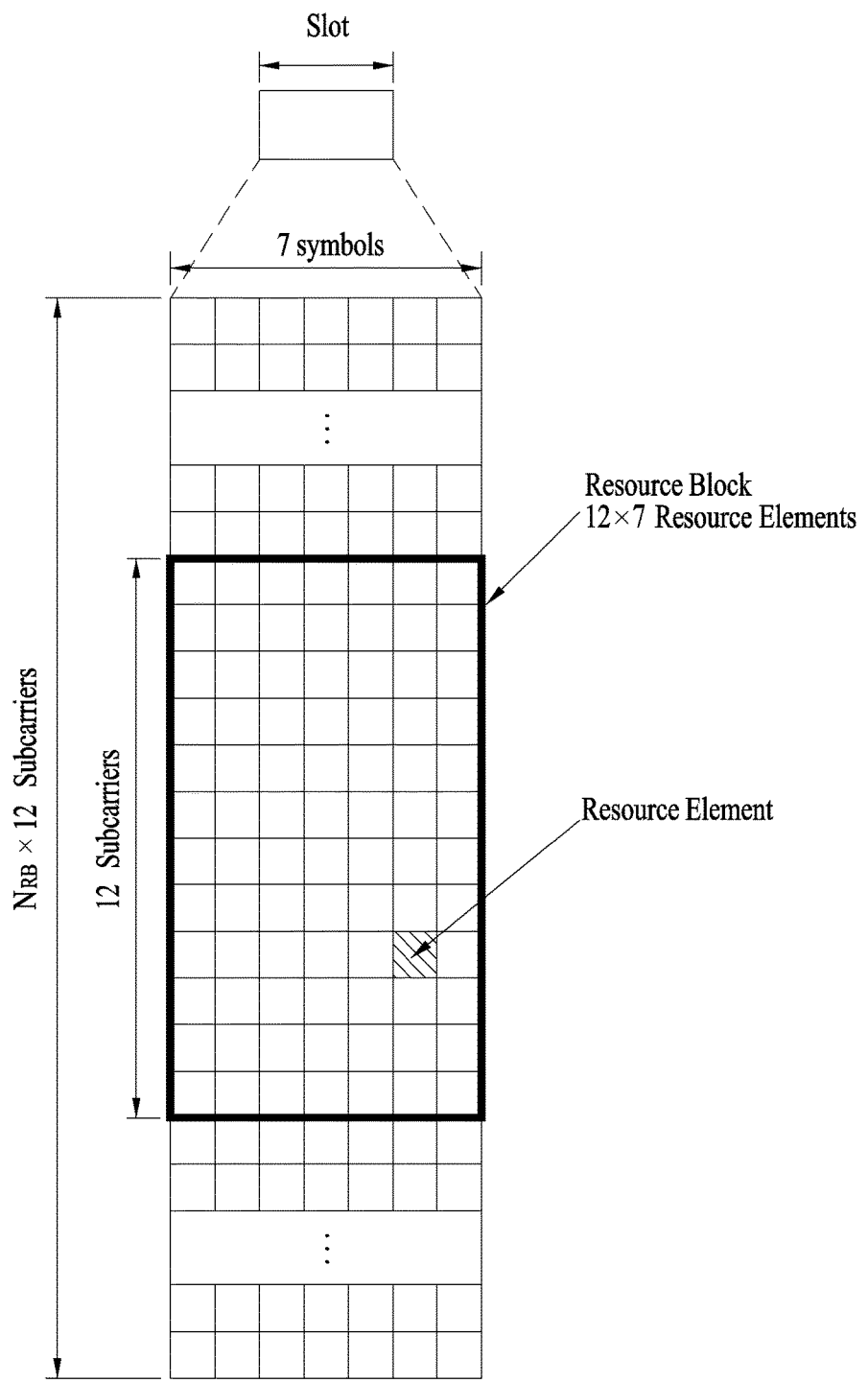
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
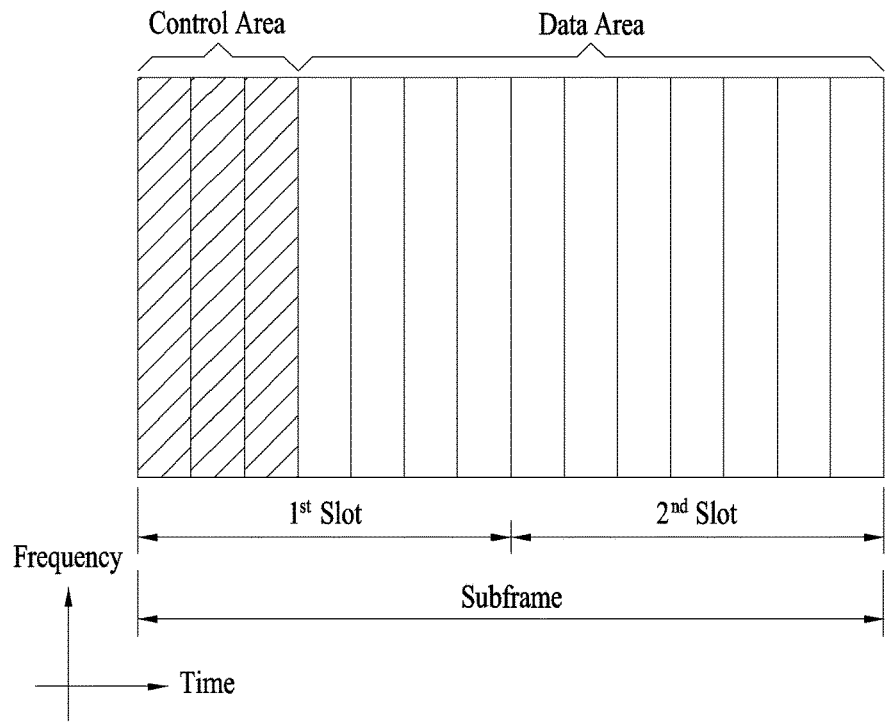
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
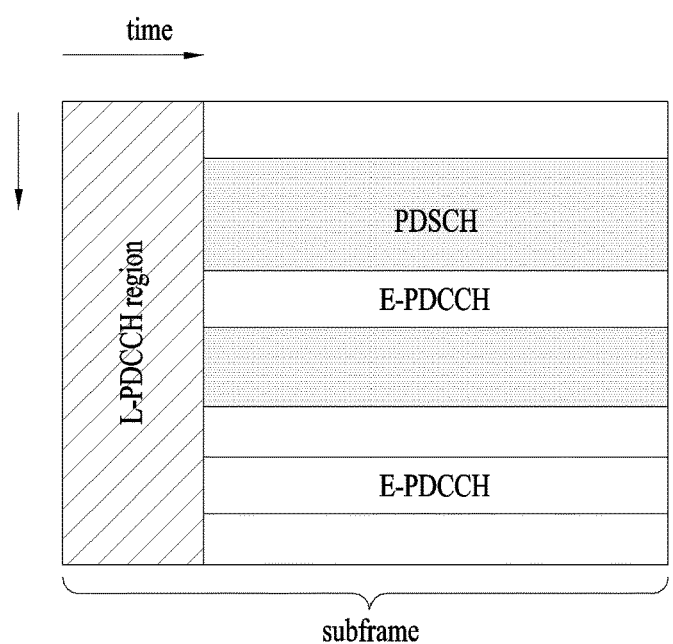
FIG. 5 illustrates an example of an Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
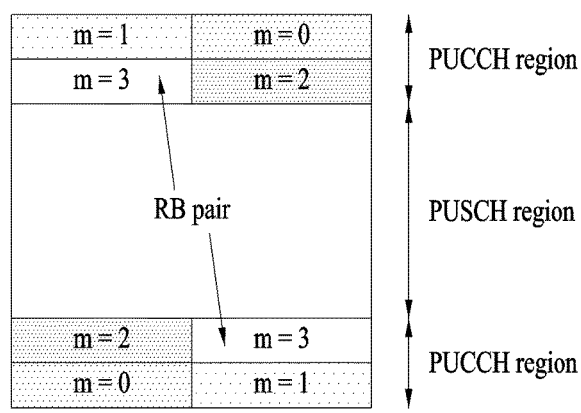
FIG. 6 illustrates the structure of an uplink subframe.

FIG. 6 illustrates an uplink subframe structure.

Referring to FIG. 6, an uplink subframe includes a plurality of (e.g. 2) slots. A slot may include different numbers of SC-FDMA symbols according to Cyclic Prefix (CP) lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) (e.g., an RB pair of a frequency mirrored location) located at both ends of the data region in the frequency domain and hopped in a slot boundary. Control information (i.e., UCI) includes HARQ ACK/NACK, CQI, PMI, RI, etc.

Figure 7:
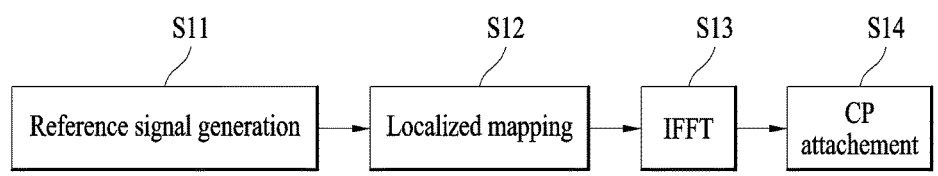
FIG. 7 illustrates a signal processing procedure for transmitting a reference signal (RS).

FIG. 7 is a diagram for describing a signal processing procedure for transmitting a reference signal on uplink. While data is converted into a frequency region signal through a DFT precoder and transmitted through IFFT after frequency mapping, a process through a DFT precoder is omitted for the RS. Specifically, an RS sequence is directly generated in the frequency region (S11) and then sequentially passes through localized mapping (S12), IFFT (S13) and cyclic prefix (CP) attachment (S14) to be transmitted.

Figure 8:
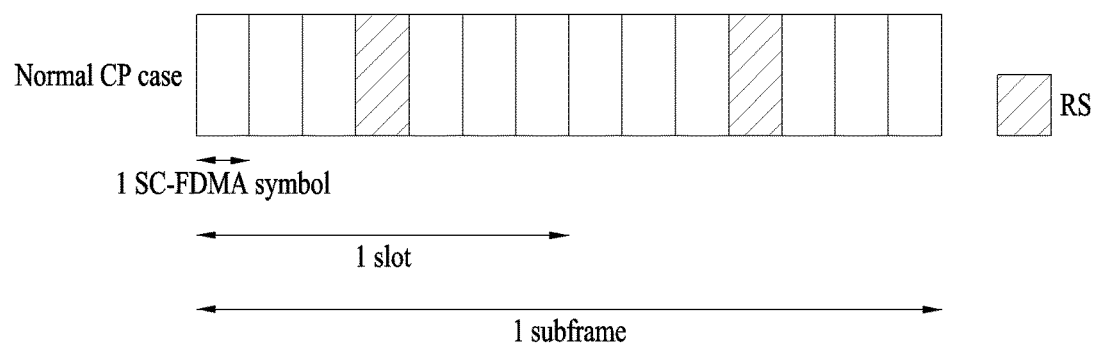
FIG. 8 illustrates a DMRS (Demodulation Reference Signal) structure for a PUSCH (Physical Uplink Shared Channel).

FIG. 8 illustrates a DMRS structure for a PUSCH in the case of a normal CP. A PUSCH DMRS is transmitted through fourth and eleventh SC-FDMA symbols in a subframe.

Figure 9:
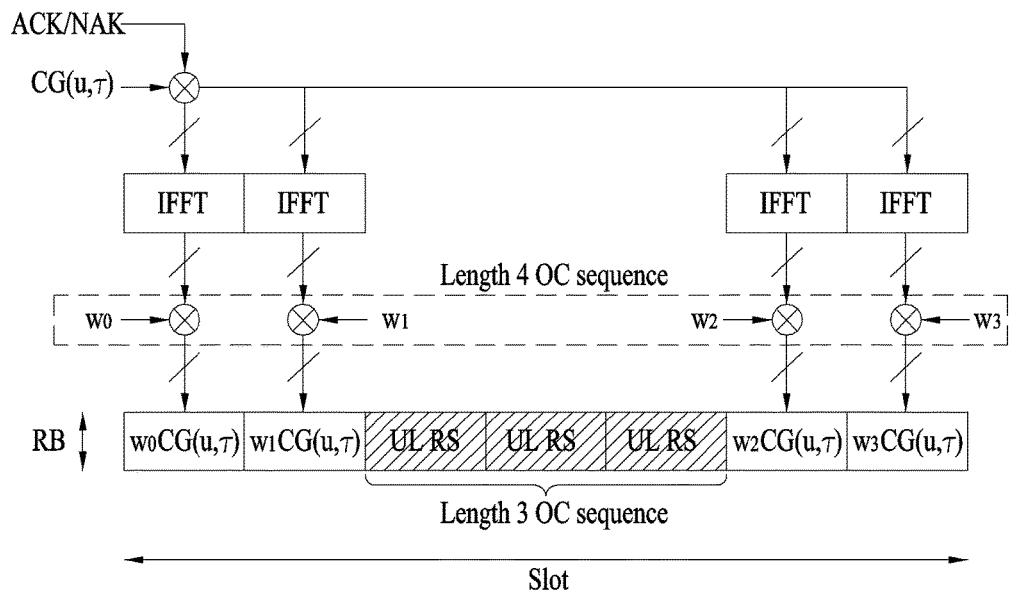
FIG. 9 illustrates a slot level structure of physical uplink control channel (PUCCH) format 1a/1b.

FIG. 9 illustrates a slot level structure of PUCCH format 1a/1b. PUCCH format 1a/1b is used for ACK/NACK transmission. In a normal CP, SC-FDMA #2/#3/#4 is used to transmit a DMRS. In an extended CP, SC-FDMA #2/#3 is used to transmit the DMRS. Therefore, 4 SC-FDMA symbols in a slot are used for ACK/NACK transmission. For convenience, PUCCH format 1a/1b is referred to as PUCCH format 1.

Referring to FIG. 9, 1-bit [b(0)] and 2-bit [b(0)b(1)] A/N information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (HACK).

In PUCCH format 1a/1b, cyclic shift (CS) ($\alpha_{cs,x}$) is performed in the frequency domain and spreading is performed using an orthogonal code (OC) (e.g. Walsh-Hadamard or DFT code) w0, w1, w2, w3 in the time domain. Since code multiplexing is used in both the frequency domain and the time domain, more UEs may be multiplexed in the same PUCCH RB.

Figure 10:
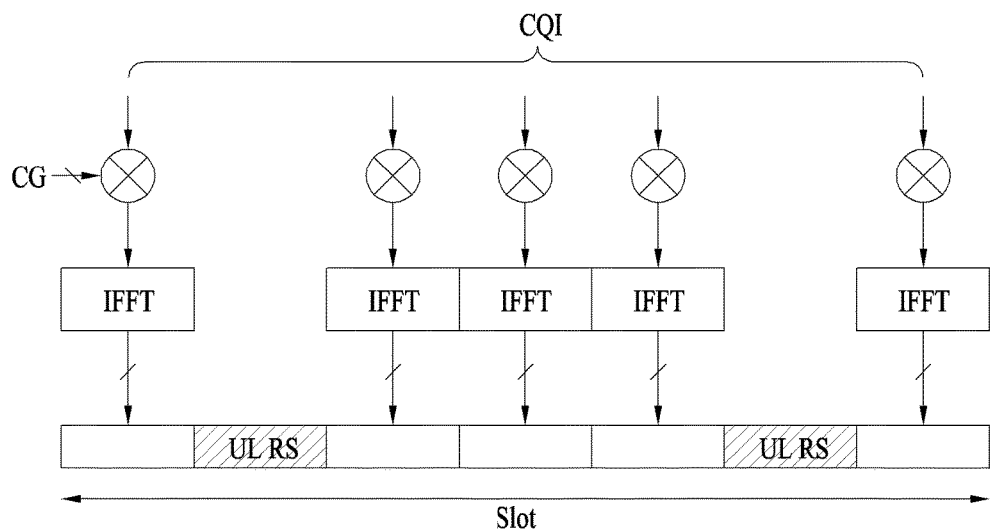
FIG. 10 illustrates a slot level structure of PUCCH format 2/2a/2b.

FIG. 10 illustrates PUCCH format 2/2a/2b. PUCCH format 2/2a/2b is used for CQI transmission. In a normal CP, one subframe includes 10 QPSK data symbols in addition to RS symbols. Each of the QPSK symbols is spread by a CS in the frequency domain and then mapped to a corresponding SC-FDMA symbol. CS hopping of an SC-FDMA symbol level may be applied for randomization of inter-cell interference. An RS may be multiplexed by CDM using a CS. For example, if the number of available CSs is 12 or 6, then 12 or 6 UEs may be multiplexed in the same PRB.

Figure 11:
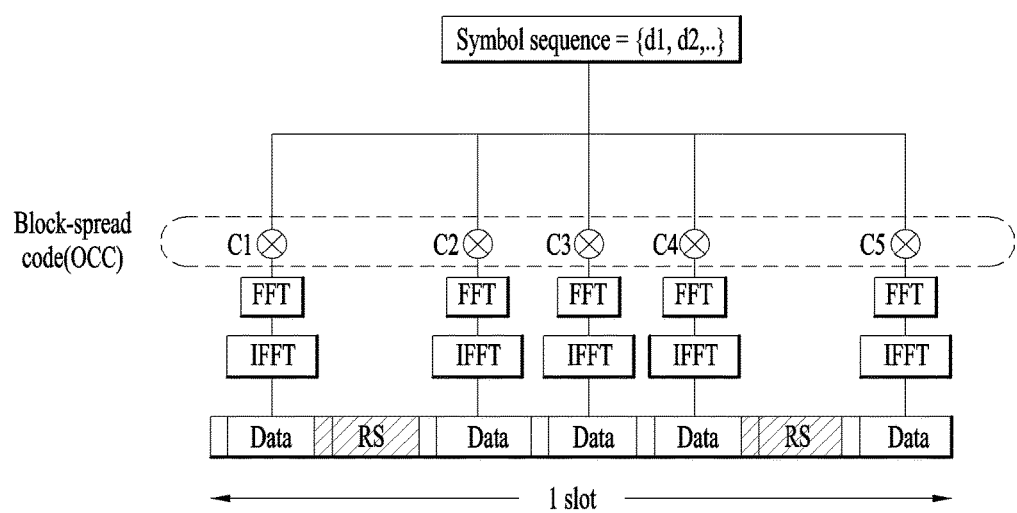
FIG. 11 illustrates a slot level structure of PUCCH format 3.

FIG. 11 illustrates the structure of PUCCH format 3 in a slot level. PUCCH format 3 is used to transmit a plurality of ACK/NACK information, and information such as CSI and/or SR may be transmitted together.

Referring to FIG. 11, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, ... } using a length-5 OCC. Here, the symbol sequence {d1, d2, ... } may be a modulation symbol sequence or a codeword bit sequence. The symbol sequence {d1, d2, ... } may be generated by performing joint coding (e.g., Reed-Muller coding, tail-biting convolutional coding, etc.), block-spreading, and SC-FDMA modulation on a plurality of ACK/NACK information.

Figure 12:
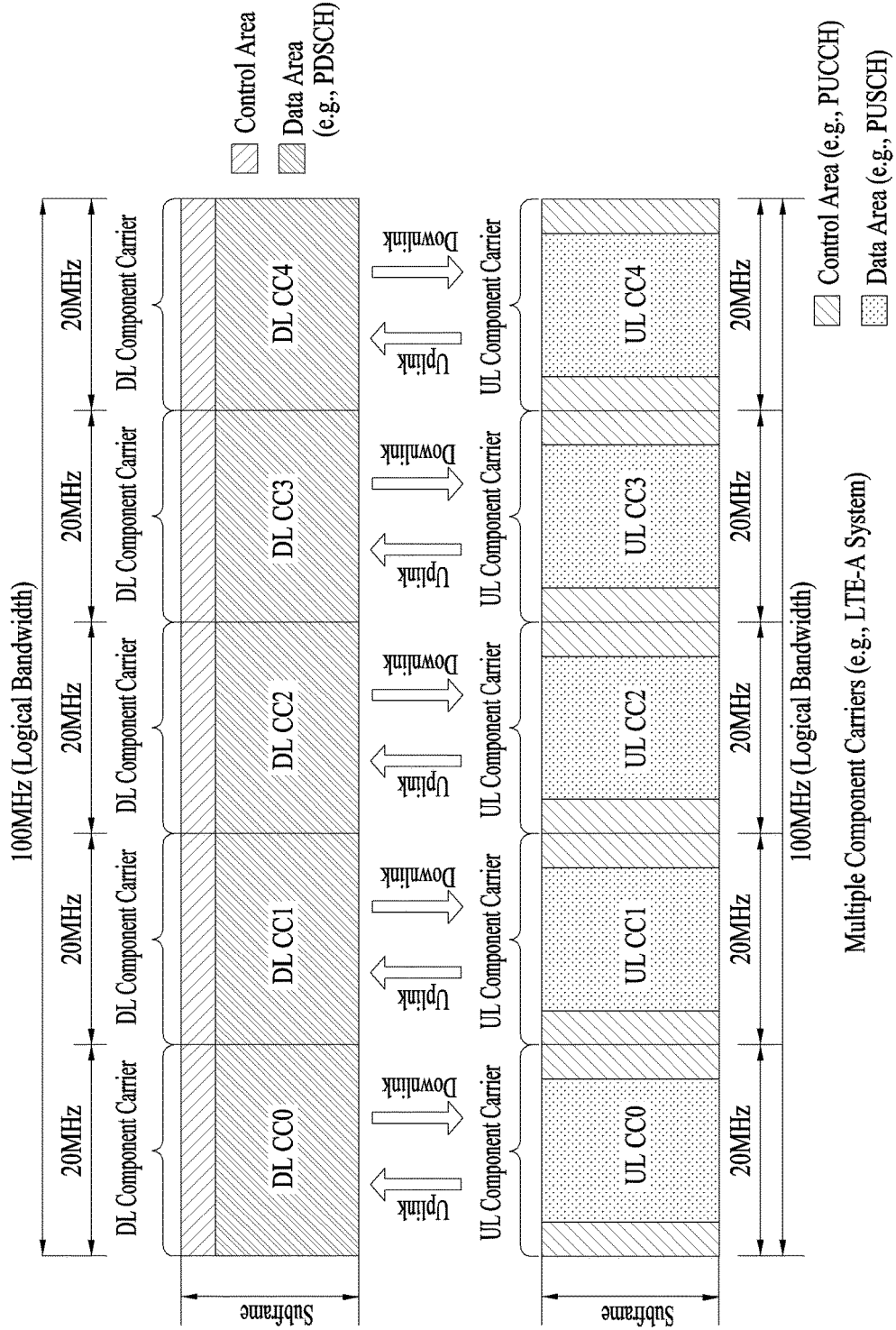
FIG. 12 illustrates a carrier aggregation (CA)-based wireless communication system.

FIG. 12 illustrates carrier aggregation (CA) communication system.

Referring to FIG. 12, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 13:
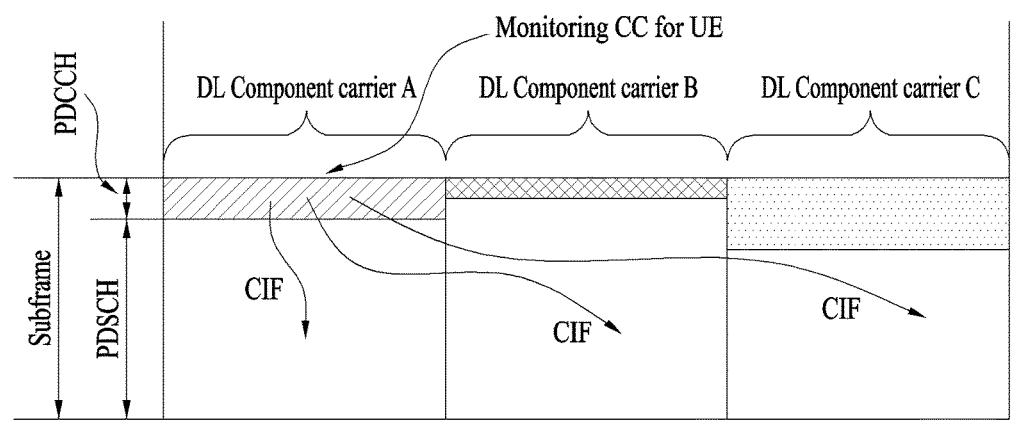
FIG. 13 illustrates cross-carrier scheduling.

FIG. 13 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Signal Transmission and Reception in LTE-U

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 μs.

Figure 14:
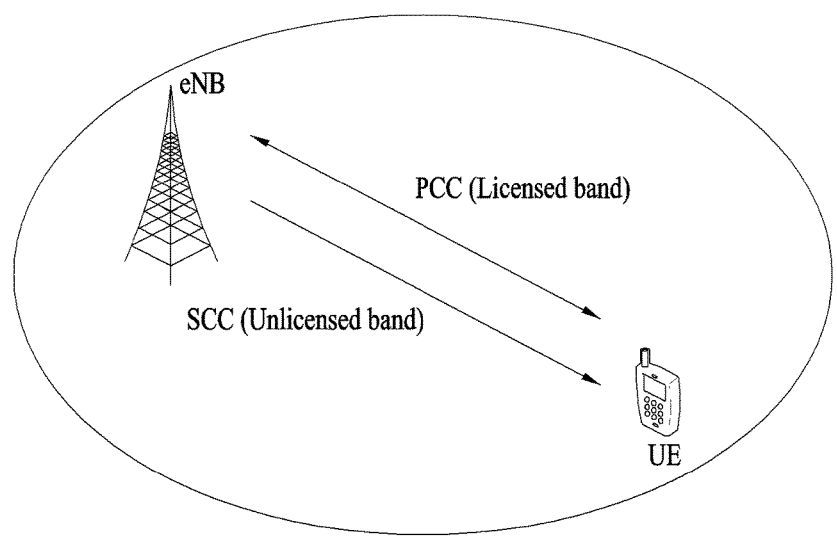
FIG. 14 illustrates carrier aggregation of a licensed band and an unlicensed band.

FIG. 14 illustrates CA of a licensed band and an unlicensed band. Referring to FIG. 14, an eNB may transmit a signal to a UE or the UE may transmit a signal to the eNB, in a CA situation of the licensed band (hereinafter, LTE-A band or L-band) and the unlicensed band (hereinafter, LTE-U band or U-band). Herein, a center carrier or frequency resource of the LTE-A band may be interpreted as a primary component carrier (PCC) or a primary cell (PCell) and a center carrier or frequency resource of the LTE-U band may be interpreted as a secondary component cell (SCC) or a secondary cell (SCell).

Figure 15:
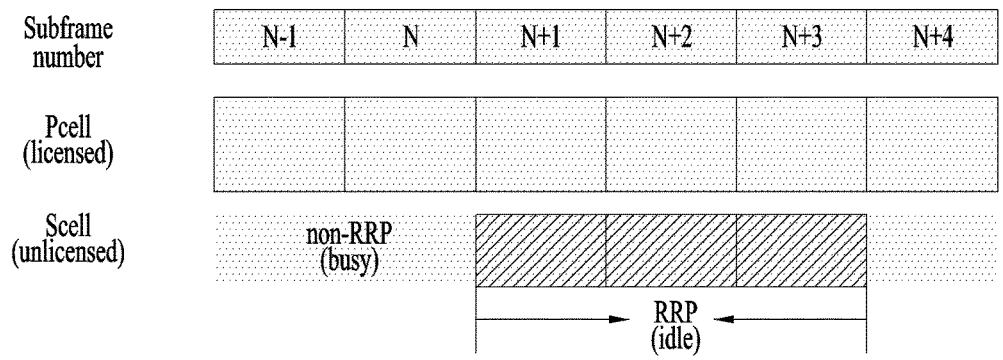
FIGS. 15 and 16 illustrate a resource reservation method on an unlicensed band.
Figure 16:
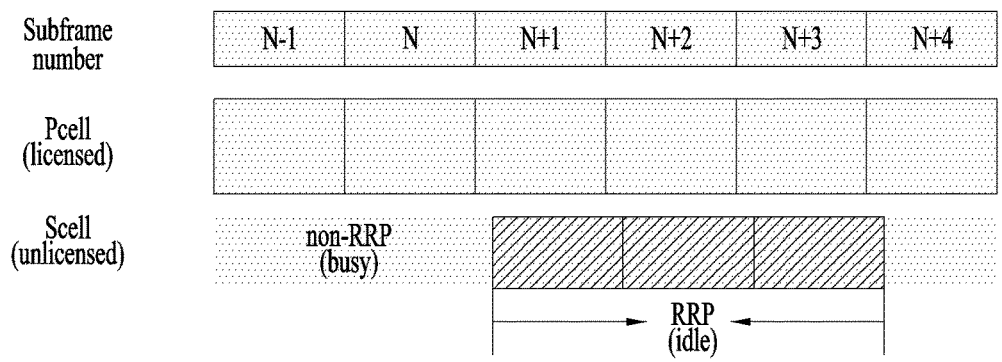

FIGS. 15 and 16 illustrate a resource reservation method on an LTE-U band. In order to perform communication on the U-band, the eNB and the UE are able to reserve/secure the U-band for a specific time duration through contention with other communication systems (e.g., Wi-Fi) irrelevant to an LTE-A system. For convenience, the time duration reserved/secured for cellular communication on the LTE-U band is referred to as a reserved resource period (RRP). To secure the RRP, various methods may be used. For example, a specific reservation signal may be transmitted in the RRP so that other communication system devices such as a Wi-Fi device may recognize that a radio channel is busy. As an example, the eNB may continuously transmit an RS and a data signal in the RRP so that a signal of a specific power level or more may be seamlessly transmitted during the RRP. If the eNB has determined the RRP during which the eNB desires to reserve the U band in advance, the eNB may pre-indicate the RRP to the UE so that the UE may maintain a communication transmission/reception link during the indicated RRP. As a scheme of indicating information about the RRP to the UE, the eNB may transmit the information about the RRP through another CC (e.g. the L band) connected in the form of CA. The RRP for UL transmission may be indicated by the eNB or may be confirmed by the UE in units of subframes by confirming a channel state through carrier sensing prior to signal transmission by the UE.

For example, the RRP including M continuous subframes (SFs) may be configured. Unlike this, one RRP may be configured as an SF set in which SFs are discontinuously present (not shown). Herein, the eNB may pre-inform the UE of the value of M and the usage of M SFs through higher layer (e.g., RRC or MAC) signaling (using a PCell) or a physical control/data channel. The start point of the RRP may be periodically set by higher layer (e.g., RRC or MAC) signaling. In addition, if it is desired that the start point of the RRP be set to SF #n, the start point of the RRP may be designated through physical layer signaling (e.g., (E)PDCCH) in SF #n or SF#(n−k) wherein k is a positive integer (e.g., 4).

The RRP may be configured such that an SF boundary or SF number/index configured on an SCell is aligned with that configured on a PCell (hereinafter, aligned-RRP) (see FIG. 15) or the SF boundary or SF number/index configured on the SCell is misaligned with that configured on the PCell (hereinafter, floating-RRP) (see FIG. 16).

As another operation example on the U band operating according to a contention based random access scheme, the eNB may first perform carrier sensing prior to data transmission and reception. The eNB may check whether a current channel state of the SCell is busy or idle and, upon checking that the current channel state of the SCell is idle, the eNB may transmit a scheduling grant (e.g., (E)PDCCH) through the PCell (L-band) or the SCell (U-band) and attempt to perform data transmission and reception on the SCell.

For convenience, an LTE-U based cell (e.g., SCell) is defined as an Unlicensed band Cell (UCell) and the center frequency of the UCell is defined as a (DL/UL) UCC. In addition, a cell (e.g., PCell or SCell) operating on a legacy licensed band is defined as an Licensed band Cell (LCell) and the center frequency of the LCell is defined as a (DL/UL) LCC. For convenience, scheduling of the UCell from the same cell and scheduling of the UCell from another cell (e.g., PCell) are referred to as self-CC scheduling and cross-CC scheduling, respectively. Further, a cell/carrier (e.g., CC) is collectively referred to as a cell. The carrier/carrier-frequency of the cell may represent an operating frequency (e.g., center frequency) of the cell, in particular, a DL operating frequency (e.g., center frequency). A (DL/UL) RRP represents a resource (duration) aperiodically secured/configured in the UCell. The RRP includes a discontinuously/aperiodically configured resource depending on a carrier sensing result.

For efficient resource use on an unlicensed band (i.e., U-band) and effective coexistence between heterogeneous systems, signal transmission on the U-band (for each region and/or band) may be subject to regulation. As an example, in relation to a power spectral density (PSD) level of a transmission signal, a transmission power per predetermined unit frequency (e.g., X [MHz]) on the U-band may be limited to a constant level (e.g., Y [dBm]) or less. As another example, in relation to a bandwidth (BW) reservation range of the transmission signal, the transmission signal on the U-band may be regulated to span a constant portion (e.g., Z [%]) or more of an entire system (nominal) BW (e.g., Z=80).

Accordingly, the present invention proposes methods of configuring an effective UL signal (e.g., a PUSCH carrying UL data or a PUCCH carrying UCI) in accordance with two regulations (i.e., restrictions on a maximum PSD level of transmitted signals and a minimum BW span) in U-band.

For convenience, it is assumed that one licensed band and one unlicensed band are aggregated for a UE and wireless communication is performed through the aggregated bands. For example, CA between a PCell operating in a conventional licensed band and an SCell operating in LTE-U is considered. However, methods proposed by the present invention are applicable to situations in which a plurality of licensed bands and a plurality of unlicensed bands are used in carrier aggregation. In addition, the proposed methods may also be applied to cases in which signal transmission and reception are performed between an eNB and a UE only through unlicensed bands. Furthermore, the methods proposed by the present invention may be extended and applied not only to 3GPP LTE but also to other systems. In the following description, the term "base station" may be used interchangeably with RRH (Remote Radio Head), eNB, TP (Transmission Point), RP Reception Point), relay and the like, and a symbol may refer to an OFDMA-based symbol, an OFDMA symbol or an SC-FDMA symbol.

(1) Wideband DMRS Based PUSCH/PUCCH Structure

Figure 17:
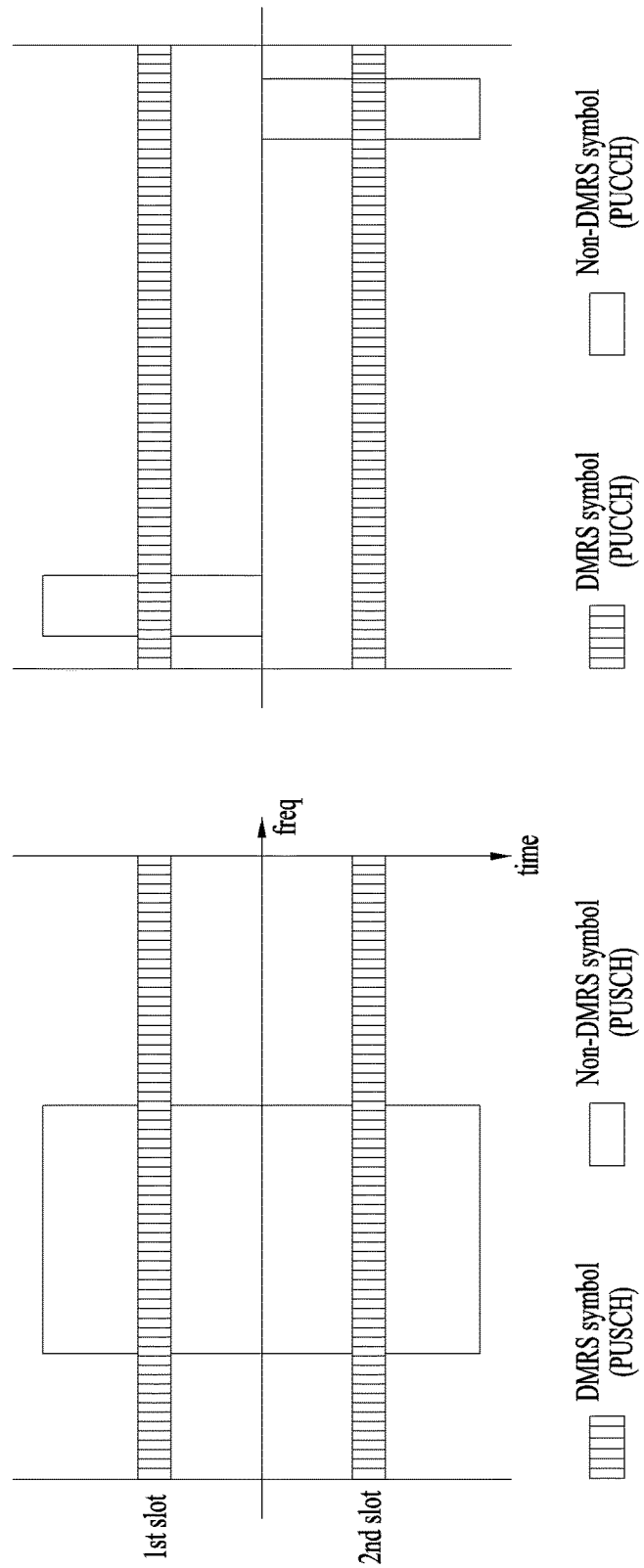
FIG. 17 illustrates a DMRS structure according to an embodiment of the present invention.

FIG. 17 illustrates DMRS structures according to an embodiment of the present invention. Referring to FIG. 17, a DMRS for demodulation of a PUSCH and/or a PUCCH transmitted through a UCell on a U-band may be configured (in the form of a wide band) to span the entire system operation BW (frequency band) or Z[%] or more thereof (referred to as a wideband DMRS hereinafter). For example, the DMRS may be configured such that a spacing between the lowest frequency and the highest frequency reserved by the DMRS corresponds to the entire system operation BW or Z[%] or more thereof. In this case, the conventional scheme may be applied to transmission band allocation/configuration of non-DMRS symbols (data transmission symbols in the case of the PUSCH and UCI transmission symbols in the case of the PUCCH) other than DMRS symbols. For example, a transmission band of non-DMRS symbols of the PUSCH may be configured using one or two clusters composed of one or more consecutive RBs and a transmission band of non-DMRS symbols of the PUCCH may be composed of a single RB (pair) to which slot hopping is applied (refer to FIG. 6).

When the wideband DMRS is configured, the minimum BW span regulation can be satisfied but the quantity of available frequency resources decreases. Accordingly, it may be necessary to secure sufficient multiplexing capacity of DMRS resources when an operation of simultaneously scheduling (i.e., multiplexing) PUSCH/PUCCH transmissions of multiple UEs in the same SF is considered.

To this end, in the case of a PUSCH DMRS, it is possible to configure/specify different DMRS resources on the basis of a time-domain OCC applied to two wideband DMRS symbols (one symbol per slot) including CS of a DMRS sequence. The time-domain OCC is applicable because frequency bands in which DRMS signals of two slots are transmitted are always set to be identical as the entire band. For example, a length-2 OCC is applicable to the PUSCH DMRS. Specifically, DMRS symbols of the first slot and DMRS symbols of the second slot may be multiplied by [+1 +1] or [+1 −1]. In addition, to increase DMRS multiplexing capacity, it is possible to configure DMRS resources using SCs which are not consecutive and have an equal interval (in units of subcarrier (SC)) or configure one DMRS resource using RBs which are not consecutive and have an equal interval (in units of RB) (referred to as "interlaced DMRS"). Based on this, different DMRS resources may be configured/specified according to SC or RB index (referred to as "PUSCH-DMRS dimensioning").

In the case of a DMRS for the PUCCH, three (e.g., PUCCH format (i.e., PF) 1/1a/1b) or two (e.g., PF2/2a/2b or PF3) wideband DMRS symbols may be transmitted and different DMRS resources may be configured/specified on the basis of at least CS, similarly to the PUSCH DMRS. In the case of the PUCCH DMRS, DMRS transmission bands of two slots are also set to the entire band (differently from the conventional PUCCH structure), and thus a time-domain OCC can be applied to six (e.g., PF1/1a/1b) or four (e.g., PF2/2a/2b/3) wideband DMRS symbols transmitted through the two slots. For example, a length-6 OCC is applicable in the case of PF1/1a/1b and a length-4 OCC is applicable in the case of PF2/2a/2b/3. Based on this, different DMRS resources may be configured/specified. In addition, the PUCCH DMRS may be configured in the form of an interlaced DMRS in units of SC or RB, and different DMRS resources may be configured/specified according to SC or RB index on the basis of the interlaced DMRS (referred to as "PUCCH-DMRS dimensioning").

(2) Interlaced SC/RB Based PUCCH/PUSCH Structure

Figure 18:
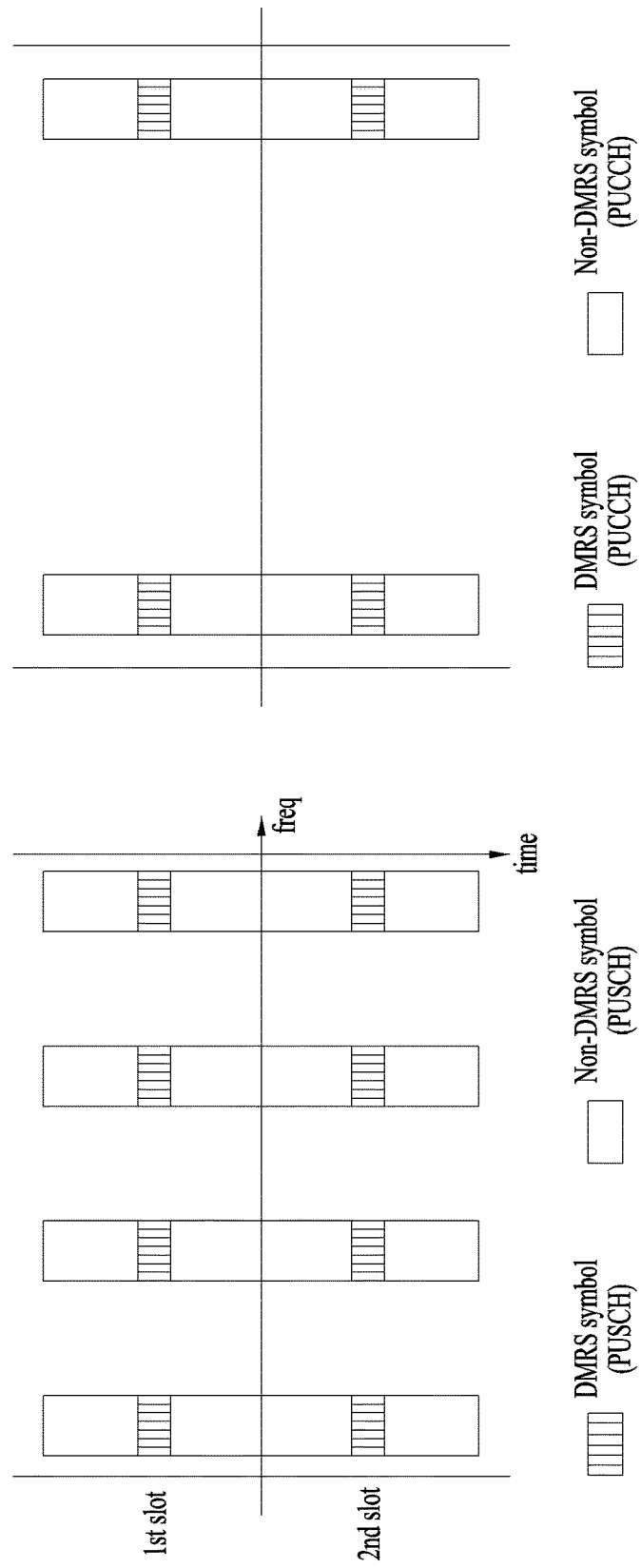
FIG. 18 illustrates PUCCH/PUSCH structures according to an embodiment of the present invention.

FIG. 18 illustrates PUCCH/PUSCH structures according to an embodiment of the present invention. Referring to FIG. 18, signals (both the DMRS symbol and the non-DMRS symbol) constituting a PUCCH and/or a PUSCH transmitted through a UCell on a U-band may be composed of SCs or RBs having equal intervals similarly to the interlaced DMRS (referred to as an interlaced PUCCH/PUSCH). Here, SC/RB based interlaced PUCCH/PUSCH transmission signals may be configured to span the entire system operating BW (frequency band) or Z[%] or more thereof. For example, the interlaced PUCCH/PUSCH may be configured such that a spacing between the lowest frequency and the highest frequency reserved by the PUCCH/PUSCH corresponds to the entire system operation BW or Z[%] or more thereof.

For example, in the case of the PUCCH, two RBs (pair) positioned at both edges of the entire frequency band may constitute one PUCCH resource and a frequency spacing between the two RBs may be set to a value which satisfies the minimum BW span regulation. As another example, one PUCCH resource may be configured over all RBs (pair) on the entire frequency band. In this case, a plurality of PUCCH resources may be configured on the basis of application of a time-domain OCC (applied symbol-wise) and/or application of a frequency-domain OCC (applied RE-wise or RB0-wise). As another example, one PUCCH/PUSCH signal may be configured over two or more SFs. In this case, a PUCCH/PUSCH signal in each SF may be configured in the same form as the conventional signal (refer to FIGS. 6 to 11). An X-wise time-domain OCC refers to multiplication of each element of an OCC by X-unit in the time domain and an X-wise frequency-domain OCC refers to multiplication of each element of an OCC by X-unit in the frequency domain.

The interlaced SC/RB based PUCCH/PUSCH is configured such that a DMRS signal is basically transmitted over two slots for the same frequency resource (e.g., SC or RB). Accordingly, CS/OCC application to the DMRS and interlaced DMRS configuration may be similarly applied in the PUSCH-DMRS dimensioning method and the PUCCH-DMRS dimensioning method. In addition, since a UCI signal (mapped to non-DMRS symbols) is also transmitted over two slots for the same frequency resource (e.g., SC or RB), a time-domain OCC (e.g., a length-8 ODD in the case of PF1/1a/1b and a length-10 OCC in the case of PF3) may be applied to all non-DMRS symbols, that is, eight UCI symbols (e.g., PF1/1a/1b) or ten UCI symbols (e.g., PF3). Alternatively, in the case of PF1/1a/1b, a length-3 OCC may be applied to three DMRS symbols and a length-4 OCC may be applied to four UCI symbols per slot, similarly to the conventional scheme, while different UCI bits are mapped to/transmitted in respective slots.

When PUSCH transmission resources are allocated in the interlaced SC/RB form, overlap may occur between a PUSCH resource and a specific PUCCH resource (configured in the interlaced SC/RB form, in the form or RBs (pair) to which slot hopping is applied, or in other forms) according to situation. A BS may signal information on a PUCCH resource region (which is a protection target) to UEs in consideration of such situation. When overlap occurs between allocated PUSCH resources and a corresponding PUCCH resource region, a UE may perform scheduled PUSCH transmission using only resources other than resources overlapping with a PUCCH among the allocated PUSCH resources. In this case, a TB (Transport Block) size corresponding to PUSCH transmission may be determined on the basis of the amount of resources other than resources overlapping with the PUCCH among the allocated PUSCHs.

Meanwhile, interlaced SCs/RBs which can be used as PUSCH transmission resources may be configured/defined over the entire system frequency band (including a PUCCH resource region) (Alt 1). In addition, in a state in which a PUCCH resource region (which is a protection target, for example) is predetermined, interlaced SCs/RBs which can be used as PUSCH transmission resources may be configured/defined only in resource regions other than the PUCCH resource region in the entire system frequency band (Alt 2). For example, a case in which the entire system BW is composed of 100 RBs and a PUCCH resource region is set to four RB indices {0, 1, 98, 99} corresponding to two smallest indices and two largest indices may be assumed. In this case, interlaced RBs available for a PUSCH resource may be configured as RBs corresponding to RB indices 0 to 99 (including the PUCCH resource region) in Alt 1. On the other hand, interlaced RBs available for a PUSCH resource may be configured to be limited to RBs corresponding to RB indices 2 to 98 other than RB indices corresponding to the PUCCH resource region in Alt 2.

Alternatively, a method of directly indicating whether a specific SC/RB among interlaced SCs/RBs allocated for PUSCH transmission is used for actual PUSCH transmission (without separate setting for a PUCCH resource region) through UL grant DCI may be considered. Here, the specific SC/RB may be configured/defined as the initial (some) SC/RB or last (some) SC/RB constituting the interlaced SCs/RBs. Alternatively, information about the initial and last SC/RB indices of SCs/RBs constituting the interlaced SCs/RBs to be used for PUSCH transmission (or information corresponding thereto) (and/or information on a spacing between neighboring SCs/RBs in the interlaced SCs/RBs) may be directly indicated through UL grant DCI.

In the case of the interlaced PUCCH/PUSCH, for example, a basic unit constituting a PUSCH/PUCCH resource may increase compared to the conventional unit. For example, the interlaced PUCCH reserves two RB pairs without slot hopping and thus may require resource overhead twice that of the conventional PUCCH (configured of one RB pair to which slot hopping is applied). When this is further normalized, if N RB pairs having an equal interval are configured as a basic PUCCH/PUSCH resource unit, the amount of resources (overhead) may increase N times that of the conventional PUCCH/PUSCH (having a single RB pair as a basic resource unit). Accordingly, it may be difficult to flexibly and efficiently use UL resources and manage UL resource overhead in UCell operation.

Accordingly, a method of configuring a PUCCH/PUSCH slotted such that a symbol period constituting a single PUCCH or PUSCH signal has a length equal to or less than a single slot is proposed in consideration of UL resource efficiency. More specifically, a single PUCCH/PUSCH signal may be transmitted through the first or second slot in one single SF. To this end, a UE may perform the following operations.

Case #1) PUCCH/PUSCH transmission may be performed through the first slot when CCA has been successfully performed in the first CCA execution period with respect to an SF in which PUCCH/PUSCH transmission is scheduled/set (e.g., the first symbol of the SF or the last symbol of the immediately previous SF).

Case #2) PUCCH/PUSCH transmission may be performed through the second slot when CCA has failed in the first CCA execution period and CCA has been successfully performed in the second CCA execution period (e.g., the first symbol of the second slot in the SF in which PUCCH/PUSCH transmission is scheduled/set or the last symbol of the first slot).

In addition, an operation of transmitting a specific signal (e.g., a reservation signal) for the purpose of reserving a UCell radio channel (from other systems/UEs) before PUCCH/PUSCH transmission when CCA for a UCell has been successfully performed may be considered. However, transmission of a reservation signal is not allowed in Case #1 and transmission of a reservation signal may be allowed only in Case #2. That is, CCA may be performed on the point of PUCCH/PUSCH transmission in order to restrict unnecessary signal transmission in Case #1 (CCA opportunity is one time). Accordingly, the UE may immediately perform PUCCH/PUSCH transmission upon successful CCA and need not reserve a radio channel before PUCCH/PUSCH transmission. On the contrary, in Case #2, CCA may be initiated earlier than in Case #1 in order to provide more CCA opportunities because CCA has failed in Case #1. In Case #2, the UE may perform a plurality of CCA procedures and, when the UE succeeds in CCA at an early stage, may transmit a reservation signal for reserving a radio channel before PUCCH/PUSCH transmission.

Figure 19:
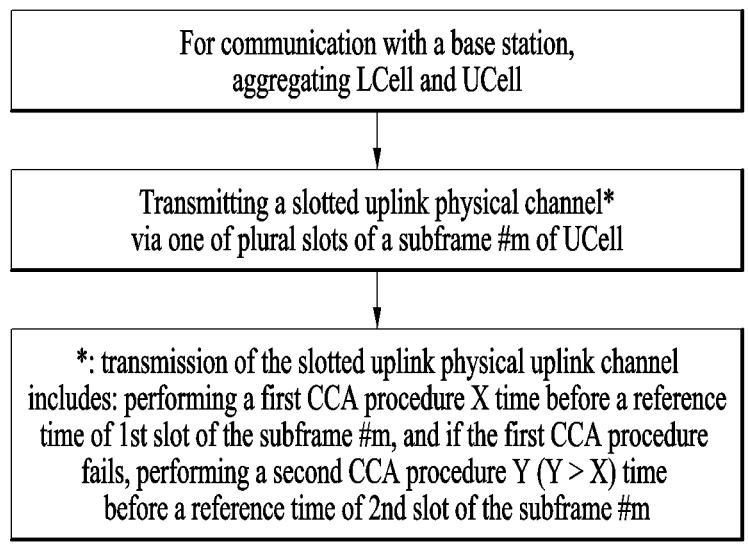
FIG. 19 illustrates a signal transmission procedure according to an embodiment of the present invention.

FIG. 19 illustrates a signal transmission procedure according to the present invention. Referring to FIG. 19, a UE may aggregate an LCell (Licensed band cell) and a UCell (Unlicensed band cell) for communication with a BS (S1502). Then, the UE may transmit a slotted uplink physical channel only in one of a plurality of slots in a subframe m (S1504). Here, transmission of the slotted uplink physical channel may include performing a first CCA procedure a time X before a reference time of the first slot of the subframe #m and, if the first CCA procedure fails, performing a second CCA procedure a time Y (Y>X) before a reference time of the second slot of the subframe #m. If the first CCA procedure has been successfully performed, the slotted uplink physical channel may be transmitted in the first slot of the subframe #m without transmission of a reservation signal. Further, if the second CCA procedure has been successfully performed, the slotted uplink physical channel may be transmitted in the second slot of the subframe #m after transmission of a reservation signal. If the second CCA procedure fails, a third CCA procedure may be further performed the time X before the reference time of the second slot of the subframe #m. The uplink physical channel may be transmitted over a plurality of slots in a subframe #n of the LCell. The uplink physical channel may include a PUCCH or a PUSCH.

A single PUCCH/PUSCH signal may be configured to be shorter than a slot length in consideration of CCA operation (referred to as "shortened slotted PUCCH/PUSCH"). For example, the shortened slotted PUCCH/PUSCH may be configured to be shorter than the slot length by one symbol.

Additionally, a (slotted) PUCCH/PUSCH may be transmitted after a predetermined symbol offset in a UL SF instead of at a conventional symbol position in a conventional SF/slot in order to secure a (symbol) period (i.e., TX gap) for CCA between consecutive SFs. For example, a start time of a (slotted) PUCCH/PUSCH may be determined as an n-th symbol of a UL SF (n=2) and an end time thereof may be determined as an m-th symbol in the second slot (instead of a symbol in the first slot) (m=1). If K CCA procedures are allowed in a single UL SF for transmission of a single PUCCH/PUSCH, n and m may have K values.

In the case of the interlaced PUCCH/PUSCH, for example, a basic resource allocation unit for PUSCH scheduling on a UCell may be configured/defined as a single RB group (referred to as I-RBG hereinafter) composed of RBs at an equal interval. In this case, the I-RBG may have a size greater than an RB which is a basic resource allocation unit for UL PUSCH scheduling on an LCell. Accordingly, a TB size (TBS) which can be selected for PUSCH scheduling may be restricted. In consideration of this problem, a method of extending a TBS selection range for PUSCH scheduling such that a TBS corresponding to a value other than an I-RBG size (the number of RBs corresponding thereto) N allocated through a UL grant can be additionally selected/indicated in addition to a TBS corresponding to N may be conceived.

Table 4 shows a relationship between a TBS size and the number of RBs. Table 4 shows a case in which the number of RBs is 1 to 10, and the TBS size is defined as up to 110 RBs. The TBS size is a bit value. $I_{TBS}$ is an index with respect to an MCS and is shown in Table 5.

TABLE 4

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 5

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |

TABLE 5-continued

| MCS Index $I_{MCS}$ | Modulation Order $Q_m$ | TBS Index $I_{TBS}$ |
|---|---|---|
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

To achieve the aforementioned method, UL resource allocation through UL grant DCI may be performed per I-RBG, PUSCH transmission may be performed through allocated I-RBG resources, and a TBS may be selected/determined as an actual TBS corresponding to a value obtained by multiplying the allocated I-RBG size (the number of RBs corresponding thereto) N by a scaling factor "k" (e.g., 0<k<1) signaled through the UL grant DCI (i.e., (k*N) RBs). If (k*N) is not an integer, an actual TBS may be selected/determined as a TBS corresponding to flooring (k*N) RBs or ceiling(k*N) RBs. Flooring is a round down function and ceiling is a round up function. Alternatively, UL resource allocation through the UL grant DCI may be performed per RB (or RBG smaller than I-RBG) as in the conventional method, the actual TBS may be selected/determined as a TBS corresponding to the number of allocated RBs, and PUSCH transmission may be performed through I-RBG resources having a number/size (e.g., a minimum value equal to or greater than M or a maximum value equal to or less than M) of RBs which is closest to the number of allocated RBs, M.

Meanwhile, in the wideband DMRS based PUSCH/PUSCH structure or the interlaced SC/RB based PUCCH/PUSCH structure, it is not easy to transmit a PUCCH/PUSCH signal in a single SF according to FDM as in conventional UL or it may be inefficient to use UL resources due to an intentional signal configuration for satisfying the minimum BW span regulation. Accordingly, a method of transmitting a PUCCH signal and a PUSCH signal in a single SF according to TDM with respect to UL on a UCell may be considered. For example, a symbol period in which a PUSCH signal is transmitted may be configured to be equal to or greater than a symbol period in which a PUCCH signal is transmitted (e.g., in the form of a slotted PUCCH/PUSCH) in a single SF. On the other hand, with respect to UL on an LCell, a PUCCH signal and a PUSCH signal may be transmitted according to FDM in a single SF as in the conventional method (refer to FIG. 6).

As a method for transmitting PUCCH/PUSCH signals according to FDM in a single SF, a method of configuring some (e.g., DMRS symbols in a specific slot or a specific DMRS symbol) of a plurality of DMRS symbols involved in transmission of a single PUCCH/PUSCH in the form of a wideband DMRS and configuring the remaining DMRS symbols only in a frequency band to/in which UCI/data symbols are mapped/transmitted in the PUCCH/PUSCH signal as in the conventional method may be considered. In this case, a wideband DMRS for a PUCCH and a wideband DMRS for a PUSCH may be configured in different symbols for smooth FDM. For example, in the case of the PUSCH, a wideband DMRS may be configured only in the first slot and a DMRS may be configured only in a data transmission band in the second slot. On the contrary, a wideband DMRS may be configured only in the second slot and a DMRS may be configured only in a data transmission band in the first slot in the case of the PUCCH. Alternatively, a DMRS symbol structure for PUCCH transmission and a DMRS symbol structure for PUSCH transmission may be configured as the same structure (e.g., a DMRS symbol structure per slot applied to the PUSCH is equally applied to PUCCH transmission). In this case, PUCCH resources may be configured in such a manner that a time-domain OCC (applied symbol-wise) and/or a frequency-domain OCC (applied RE-wise or RB-wise) are applied to all non-DMRS symbols in a single SF or a plurality of non-DMRS symbols in each slot.

The principle of the proposal and application of operating methods in the present invention are not limited to UL on a UCell and may be equally applied to transmission of UL signals (e.g., a data channel and/or a control channel) on any cell including LCells (irrespective of cell type).

Figure 20:
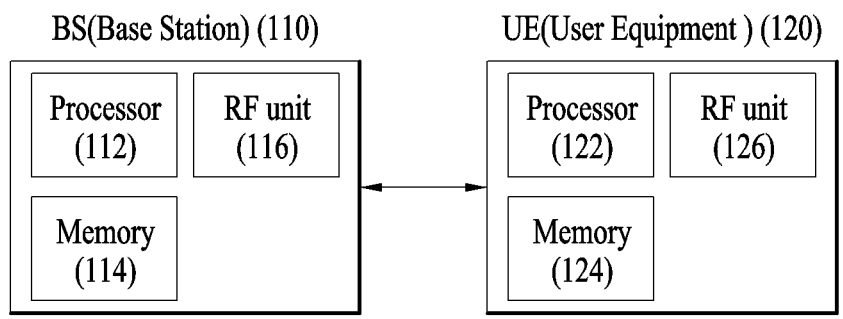
FIG. 20 illustrates a base station and a user equipment applicable to an embodiment of the present invention.

FIG. 20 illustrates a BS and a UE of a wireless communication system, which are applicable to embodiments of the present invention.

Referring to FIG. 20, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to a user equipment, a base station, or other devices of wireless mobile communication systems.

The invention claimed is:

1. A method of transmitting an uplink signal by a user equipment (UE) in a wireless communication system, the method comprising:
aggregating a licensed band cell (LCell) and an unlicensed band cell (UCell) in order to communicate with a base station; and
transmitting a slotted uplink physical channel in only one of a plurality of slots of a subframe #m of the UCell,
wherein transmission of the slotted uplink physical channel includes performing a first clear channel assessment (CCA) procedure before a time X from a reference time of a first slot of the subframe #m and if the first CCA procedure fails, performing a second CCA procedure before a time Y (Y>X) from a reference time point of a second slot of the subframe #m.

2. The method according to claim 1, wherein the slotted uplink physical channel is transmitted in the first slot of the subframe #m without transmission of a reservation signal when the first CCA procedure has been successfully performed.

3. The method according to claim 2, wherein the slotted uplink physical channel is transmitted in the second slot of the subframe #m after transmission of the reservation signal when the second CCA procedure has been successfully performed.

4. The method according to claim 1, wherein a third CCA procedure is further performed before the time X from the reference time of the second slot of the subframe #m when the second CCA procedure fails.

5. The method according to claim 1, wherein the uplink physical channel is transmitted over a plurality of slots of a subframe #n of the LCell.

6. The method according to claim 5, wherein the uplink physical channel includes a physical uplink control channel (PUCCH) or a physical uplink shared channel (PUSCH).

7. A user equipment (UE) configured to transmit an uplink signal in a wireless communication system, the UE comprising:
a radio frequency (RF) module; and
a processor,
wherein the processor is configured to aggregate a licensed band cell (LCell) and an unlicensed band cell (UCell) in order to communicate with a base station and to transmit a slotted uplink physical channel in only one of a plurality of slots of a subframe #m of the UCell, and
wherein transmission of the slotted uplink physical channel includes performing a first CCA procedure before a time X from a reference time of a first slot of the subframe #m and if the first CCA procedure fails, performing a second CCA procedure before a time Y (Y>X) from a reference time point of a second slot of the subframe #m.

8. The UE according to claim 7, wherein the slotted uplink physical channel is transmitted in the first slot of the subframe #m without transmission of a reservation signal when the first CCA procedure has been successfully performed.

9. The UE according to claim 8, wherein the slotted uplink physical channel is transmitted in the second slot of the subframe #m after transmission of the reservation signal when the second CCA procedure has been successfully performed.

10. The UE according to claim 7, wherein a third CCA procedure is further performed before the time X from the reference time of the second slot of the subframe #m when the second CCA procedure fails.

11. The UE according to claim 7, wherein the uplink physical channel is transmitted over a plurality of slots of a subframe #n of the LCell.

12. The UE according to claim 11, wherein the uplink physical channel includes a physical uplink control channel (PUCCH) or a physical uplink shared channel (PUSCH).

* * * * *